US011354537B2

(12) United States Patent
Kimura

(10) Patent No.: US 11,354,537 B2
(45) Date of Patent: Jun. 7, 2022

(54) IMAGE PROCESSING APPARATUS, IMAGING APPARATUS, IMAGE PROCESSING METHOD, AND STORAGE MEDIUM

(71) Applicant: CANON KABUSHIKI KAISHA, Tokyo (JP)

(72) Inventor: Yoshinori Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 16/715,042

(22) Filed: Dec. 16, 2019

(65) Prior Publication Data
US 2020/0117949 A1 Apr. 16, 2020

Related U.S. Application Data

(63) Continuation of application No. PCT/JP2018/022997, filed on Jun. 15, 2018.

(30) Foreign Application Priority Data

Jun. 21, 2017 (JP) .............................. JP2017-120955

(51) Int. Cl.
*G06K 9/62* (2022.01)
*G06N 3/04* (2006.01)
(Continued)

(52) U.S. Cl.
CPC ............ *G06K 9/6251* (2013.01); *G06K 9/629* (2013.01); *G06N 3/0454* (2013.01); *G06N 3/08* (2013.01);
(Continued)

(58) Field of Classification Search
CPC .... G06K 9/6251; G06K 9/4619; G06K 9/629; G06N 3/0454; G06T 5/003; G06T 2207/20084
See application file for complete search history.

(56) References Cited

U.S. PATENT DOCUMENTS 6,018,728 A 1/2000 Spence
9,530,071 B2 * 12/2016 Yin ........................... G06T 3/00
(Continued)

FOREIGN PATENT DOCUMENTS

EP 3171297 A1 5/2017
JP H03095664 A 4/1991
(Continued)

OTHER PUBLICATIONS

Decision of Rejection issued in Japanese Appln. No. 2017-120955 dated Jun. 29, 2021. English translation provided.
(Continued)

*Primary Examiner* — Fayyaz Alam
(74) *Attorney, Agent, or Firm* — Rossi, Kimms & McDowell LLP

(57) ABSTRACT

An image processing apparatus includes a main unit configured to convert an input image into information of a first feature amount using a first convolutional neural network having at least two layers, an input unit configured to convert the input image into information of a second feature amount using a second convolutional neural network, and an output unit configured to convert information of a third feature amount generated by adding the information of the first feature amount and the information of the second feature amount to each other, into an output image using a third convolutional neural network.

17 Claims, 8 Drawing Sheets

(51) Int. Cl.
- *G06N 3/08* (2006.01)
- *G06T 5/00* (2006.01)
- *G06V 10/44* (2022.01)

(52) U.S. Cl.
CPC ............ *G06T 5/003* (2013.01); *G06V 10/449* (2022.01); *G06T 2207/20084* (2013.01)

(56) References Cited

U.S. PATENT DOCUMENTS

| | | | | |
|---|---|---|---|---|
| 2011/0115950 | A1* | 5/2011 | Wach | H04N 5/357 348/241 |
| 2015/0339571 | A1 | 11/2015 | Krizhevsky | |
| 2019/0095795 | A1* | 3/2019 | Ren | G06N 3/082 |

FOREIGN PATENT DOCUMENTS

| | | |
|---|---|---|
| JP | 2000506642 A | 5/2000 |
| JP | 2001005967 A | 1/2001 |
| JP | 2016153984 A | 8/2016 |
| JP | 2017059090 A | 3/2017 |
| WO | 9729437 A1 | 8/1997 |

OTHER PUBLICATIONS

Oliveira "Efficient and Robust Deep Networks for Semantic Segmentation" The International Journal of Robotics Research. Jun. 2017: pp. 1-18. Cited in NPL 4.

Ilzuka "Let there be Color!: Joint End-to-end Learning of Global and Local Image Priors for Automatic Image Colorization with Simultaneous Classification" ACM Transactions on Graphics. Jul. 2016: pp. 1-11. vol. 35 No. 4. Cited in NPL 4.

Lin "RefineNet: Multi-Path Refinement Networks for High-Resolution Semantic Segmentation" arXiv:1611.06612v3. [cs.CV]. Nov. 25, 2016: pp. 1-11 Cited in NPL 4.

Extended European Search Report issued in European Appln. No. 18821356.5 dated Feb. 23, 2021.

English translation of Written Opinion issued in Intl. Appln. No. PCT/JP2018/022997 dated Jul. 24, 2018, previously cited in IDS filed Dec. 16, 2019.

International Preliminary Report on Patentability issued in Intl. Appln. No. PCT/JP2018/022997 dated Jan. 2, 2020 English translation provided.

International Search Report issued in Intl. Appln. No PCT/JP2018/022997 dated Jul. 24, 2018. English translation provided.

Written Opinion issued in Intl. Appln. No. PCT/JP2018/022997 dated Jul. 24, 2018.

He. "Deep Residual Learning for Image Recognition." The IEEE Conference on Computer Vision and Pattern Recognition, USA, 2015, pp. 770-778. Cited in Specification.

Xie. "Holistically-Nested Edge Detection." The IEEE International Conference on Computer Vision, USA, 2015, pp. 1395-1403. Cited in Specification.

Glorot. "Understanding the difficulty of training deep feedforward neural networks." Proceedings of the 13th International Conference on Artificial Intelligence and Statistics, 2010, pp. 249-256. Cited in Specification.

MAO. "Image Restoration Using Convolutional Auto-encoders with Symmetric Skip Connections." arXiv:1606.08921v3, 2016, pp. 1-17. Cited in Specification.

Office Action issued in Japanese Appln. No. 2017-120955 dated Apr. 13, 2021. English translation provided.

\* cited by examiner

IMAGE PROCESSING APPARATUS, IMAGING APPARATUS, IMAGE PROCESSING METHOD, AND STORAGE MEDIUM

CROSS-REFERENCE TO RELATED APPLICATIONS

This application is a Continuation of International Patent Application No. PCT/JP2018/022997, filed on Jun. 15, 2018, which claims the benefit of Japanese Patent Application No. 2017-120955, filed on Jun. 21, 2017, both of which are hereby incorporated by reference herein in their entirety.

BACKGROUND OF THE INVENTION

Field of the Invention

The present invention relates to an image processing apparatus that provides accurate image processing using a convolutional neural network (CNN).

Description of the Related Art

Multilayer CNN and multiscale (multiresolution) CNN have been known as the conventional CNN. Kaiming He, Xiangyu Zhang, Shaoqing Ren, Jiang Sun, "Deep residual learning for image recognition", The IEEE Conference on Computer Vision and Pattern Recognition, USA, 2015, pp. 770-778 (He et al.) discloses ResNet serving as representative multilayer CNN. Saining Xie, Zhuown Tu, "Holistically-nested edge detection", The IEEE International Conference on Computer Vision, USA, 2015, pp. 1395-1403 (Xie et al.) discloses HED (Holistically-nested Edge Detection) serving as representative multiscale CNN.

The ResNet disclosed in He et al. enables multilayer network learning, but cannot use the multiscale expression information. The HED disclosed in Xie et al. extracts a feature map that is multiscale information from an intermediate layer in the multilayer CNN. However, the HED does not propose a promotion of the multilayer network learning, and thus cannot learn when the network is multilayered.

Thus, the conventional CNN does not have a network structure that is compatible with use of the multiscale representation information and the multilayer network learning. Hence, accurate image processing is difficult using the conventional CNN.

SUMMARY OF THE INVENTION

The present invention provides an image processing apparatus, an imaging apparatus, an image processing method, and a storage medium, each of which can perform highly accurate image processing using a network structure that is compatible with use of multiscale expression information and multilayer network learning.

An image processing apparatus according to one aspect of the present invention includes a main unit configured to convert an input image into information of a first feature amount using a first convolutional neural network having at least two layers, an input unit configured to convert the input image into information of a second feature amount using a second convolutional neural network, and an output unit configured to convert information of a third feature amount generated by adding the information of the first feature amount and the information of the second feature amount to each other, into an output image using a third convolutional neural network.

An imaging apparatus according to another aspect of the present invention includes an imaging unit configured to acquire an input image, and the above image processing apparatus.

An image processing method according to another aspect of the present invention includes the steps of converting an input image into information of a first feature amount using a first convolutional neural network having at least two layers, converting the input image into information of a second feature amount using a second convolutional neural network, and converting information of a third feature amount generated by adding the information of the first feature amount and the information of the second feature amount to each other, into an output image using a third convolutional neural network.

A storage medium according to another aspect of the present invention stores a program that causes a computer to execute the image processing method.

Further features of the present invention will become apparent from the following description of exemplary embodiments with reference to the attached drawings.

DESCRIPTION OF THE EMBODIMENTS

Figure 1:
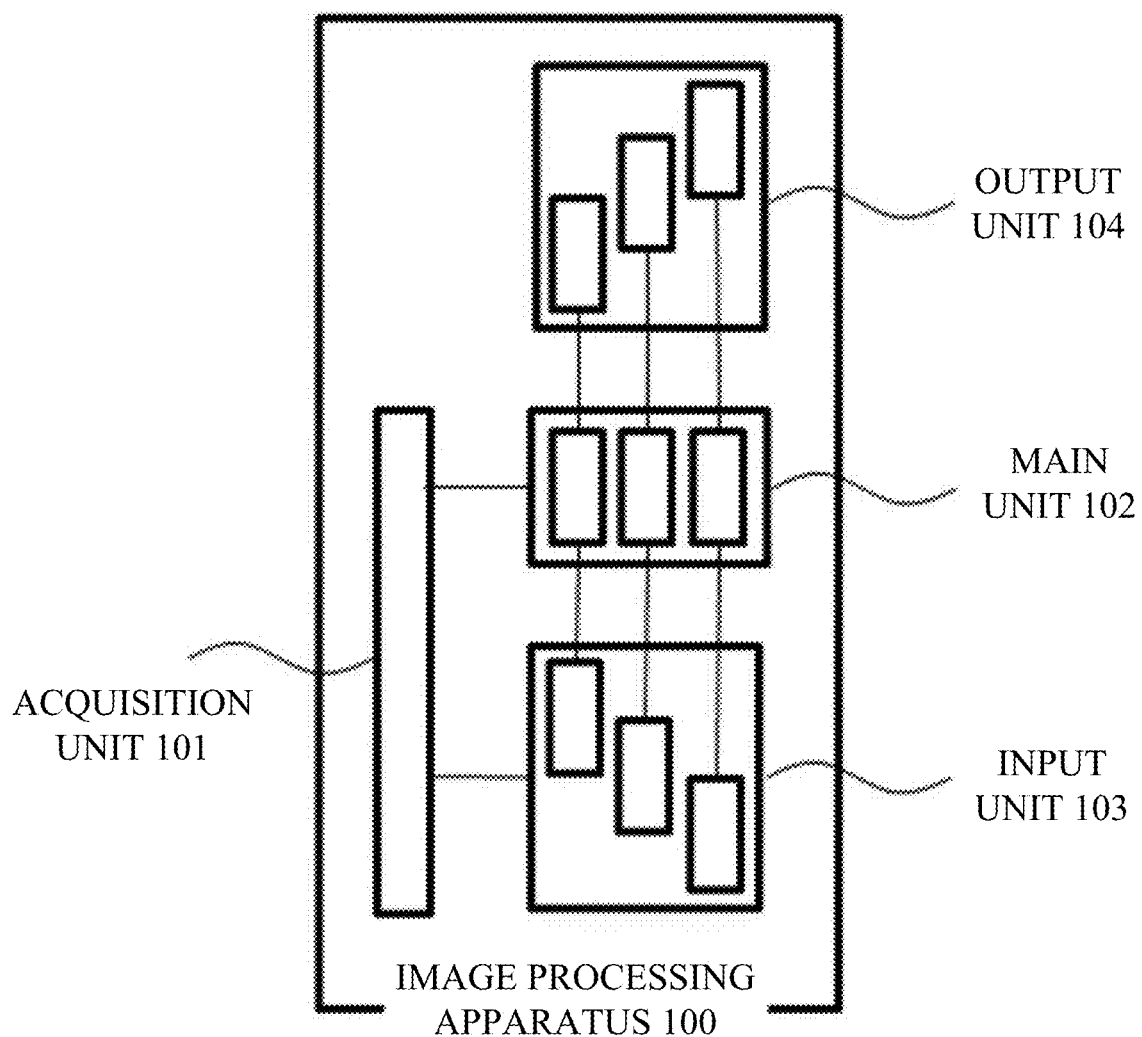
FIG. 1 is a block diagram of an image processing apparatus in each embodiment.

Referring now to the accompanying drawings, a detailed description will be given of embodiments according to the present invention.

A description will now be given of the CNN as the background of the present invention. The CNN is a learning-type image processing technique that convolves a filter generated by training or learning with an image, and then repeats a nonlinear calculation. An image obtained by convolving the filter with an image and by performing the nonlinear calculation is called a feature map. In addition to the convolution, processing called a deconvolution (transposed convolution) will also appear later, but this is one type of convolution, and will be described each time. Further, learning is performed using training images or data sets including a pair of an input image and an output image. To be brief, learning is to generate from the training image a filter value that can be converted from the input image to the corresponding output image with high accuracy. A detailed description will be given of this later.

When the image has RGB color channels, or when the feature map has a plurality of images, the filter used for the convolution also has a plurality of channels accordingly. That is, the convolution filter is expressed by a four-dimensional array in which the number of channels is added to the vertical and horizontal sizes and the number of sheets.

The processing of the nonlinear calculation after the filter is convoluted with the image (or feature map) is expressed in units called layers. For example, it is called an m-th layer feature map or an n-th layer filter. Also, for example, a CNN that repeats the filter convolution and the nonlinear calculation three times has a three-layer network structure.

This processing can be formulated as the following expression (1).

$$X_n^{(l)} = f\left(\sum_{k=1}^{K} W_n^{(l)} * X_{n-1}^{(k)} + b_n^{(l)}\right) \quad (1)$$

In the expression (1), $W_n$ is an n-th layer filter, $b_n$ is an n-th layer bias, f is a nonlinear operator, $X_n$ is an n-th layer feature map, and * is a convolution operator. (l) on the right shoulder represents an l-th filter or feature map. The filter and the bias are generated by learning described later, and collectively referred to as network parameters. The nonlinear calculation uses, for example, a sigmoid function or ReLU (Rectified Linear Unit).

The ReLU is given by the following expression (2).

$$f(X) = \begin{cases} X & \text{if } 0 \leq X \\ 0 & \text{otherwise} \end{cases} \quad (2)$$

In other words, this is nonlinear processing in which the negative elements are zero and the positive elements are maintained in an input vector X. The ReLU may not be suitable depending on an application for outputting the negative value. In that case, it is known to use LReLU (Leaky ReLU) or PReLU (Parametic ReLU).

The LReLU is given by the following expression (3).

$$f(X) = \begin{cases} X & \text{if } 0 \leq X \\ 0.01X & \text{otherwise} \end{cases} \quad (3)$$

In other words, this is nonlinear processing that multiplies the negative element in the input vector X by 0.01 and maintains the positive element as it is. The PReLU has a variable (parametric) weight to be applied to the negative element in the input vector X, and can be expected to learn more accurately than the LReLU, but it requires a much more time and a more computational load by that amount.

Next follows a description of the CNN learning. In the CNN learning, an objective function generally expressed by the following expression (4) is minimized for a training image including a set of an input training image (deteriorated image) and a corresponding output training image (sharp ground truth image).

$$L(\theta) = \frac{1}{n}\sum_{i=1}^{n} \|F(X_i; \theta) - Y_i\|_2^2 \quad (4)$$

Herein, L is a loss function for measuring an error between the ground truth and its estimation. $Y_i$ is an i-th output training image, and $X_i$ is an i-th input training image. F is a function that collectively represents calculations (see the expression 1) performed in each layer of the CNN. θ is a network parameter (filter and bias). $//Z//_2$ is an L2 norm, which is simply a square root of the sum of squares of the elements of a vector Z.

In addition, n is the total number of training images used for learning, but generally the total number of training images is large (up to several tens of thousands) and thus part is selected at random and used for learning in Stochastic Gradient Descent (SGD). Thereby, the calculation load in learning using many training images can be reduced.

There are known a variety of methods such as a momentum method, an AdaGrad method, an AdaDelta method, and an Adam method as a method for minimizing (=optimizing) an objective function.

The Adam method is given by the following expression (5).

$$\begin{aligned} g &= \frac{\partial L}{\partial \theta_i^t} \\ m &= \beta_1 m + (1 - \beta_1)g \\ v &= \beta_2 v + (1 - \beta_2)g^2 \\ \theta_i^{t+1} &= \theta_i^t - \alpha\frac{\sqrt{1-\beta_2}}{(1-\beta_1)}\frac{m}{(\sqrt{v}+\varepsilon)} \end{aligned} \quad (5)$$

In the expression (5), $\theta_i^t$ is an i-th network parameter at the t-th iteration, and g is a slope of the loss function L with respect to $\theta_i^t$. Also, m and v are moment vectors, α is a base learning rate, $\beta_1$ and $\beta_2$ are hyper parameters, and ε is a small constant. There is currently no guideline for selecting an optimization method in learning and thus basically anything can be used, but it is known that there is a difference in learning time due to a difference in convergence between methods.

Next follows a description of a classification of the CNN. The CNN can be roughly classified into two types: the multilayer CNN and the multiscale (multiresolution) CNN.

The multilayer CNN is a CNN that achieves high processing accuracy by iterating a filter convolution many times, and is famous for Res-Net in the image recognition field and applied RED-Net in the super-resolution field. Herein, the ResNet is characterized by a network structure provided with a route that shortcuts the convolutional layer, thereby realizing a multilayer network as many as 152 layers and realizing highly accurate recognition closer to the human recognition rate. Details are described in He et al. The reason why the processing is highly accurate by the multilayer CNN is that the nonlinear relationship can be expressed between input and output simply by repeating the nonlinear calculation many times.

The multiscale CNN is a CNN that uses the multiscale (multiresolution) expression information to improve the processing accuracy. A representative method of the multiscale expression includes (1) a method of using an image of the multiscale expression as an input image, (2) a method of using a plurality of networks with different filter sizes, and (3) a method of extracting a feature map as the multiscale (multiresolution) information from an intermediate layer of the multilayer CNN. Herein, the methods (1) and (2) are easy to understand, but the method (3) is difficult to understand and thus will be briefly described. Intuitively, the filter is convolved with the image, and the resultant feature map has a lower resolution than the original image (see the expression (6) described later). Thus, it can be said that the feature map obtained by performing the filter convolution many times and obtained in the intermediate layer is multiscale expression information of the original image. A more detailed description will be given in Xie et al. The reason why the processing is highly accurate by the multiscale CNN is that information in a variety of ranges (resolutions) can be used for processing in the input image.

Referring now to FIG. 1, a description will be given of an illustrative configuration of the image processing apparatus according to this embodiment. FIG. 1 is a block diagram of the image processing apparatus 100. The image processing apparatus 100 includes an acquisition unit 101, a main unit 102, an input unit 103, and an output unit 104.

The acquisition unit 101 acquires an input image. The acquisition unit 101 may be configured to acquire digital image data, and may be a digital camera or a digital scanner, for example. The input image is generally a deterioration image that is deteriorated. For example, a deteriorating factor for a digital camera can include a blur caused by an imaging optical system and an optical low-pass filter, a noise caused by an image sensor, a demosaicing error, and the like. The image deterioration process is preferably known. This is because a large number of training images required in the above CNN learning can be generated by the numerical calculation. However, since a training image may be prepared in some cases, it is not essential that the image deterioration process is known.

The format of the image data may be computer-readable digital data, and may be, for example, RAW, BMP (Bitmap), and JPEG (Joint Photographic Experts Group). The input image may be any one of a colored image, a monochromatic image, or a motion image (a plurality of images). For simplicity purposes, this embodiment assumes that each of the input image and the output image is a monochromatic image.

The main unit 102 is the above CNN, and includes, for example, a PC (Personal Computer), a workstation, an FPGA (Field Programmable Gate Array), and a server. The main unit 102 may be a computer capable of implementing the CNN computation. The main unit 102 has a network structure having at least two layers. That is, the main unit 102 performs a convolution using the plurality of filters at least twice with the input image acquired by the acquisition unit 101, an addition of the bias, and a nonlinear calculation. The main unit 102 then outputs a feature map (first feature amount information) having a different resolution or scale in the intermediate layers.

The resolution of the feature map obtained in the intermediate layer is given by the following expression (6) from the vertical and horizontal sizes of the filter used for the convolution.

$$YH = H - FH + 1$$

$$YW = W - FW + 1 \qquad (6)$$

In the expression (6), H and W are the vertical and horizontal sizes of the input image (or the feature map to be convolved), YH and YW are the vertical and horizontal sizes of the output image (or the feature map obtained by the convolution), and FH and FW are the vertical and horizontal sizes of the filter used for the convolution, respectively. Thereby, it is understood that the feature map obtained by convolving the filter with the image is smaller in size (i.e., in resolution) than the original image. For example, a feature map obtained by convolving a filter with 3×3 vertical and horizontal sizes twice and a feature map obtained by convolving a filter with 5×5 vertical and horizontal sizes once have the same vertical and horizontal size (resolution).

Since the input image is assumed to be a monochromatic image (the number of channels of 1), the number of channels in the first layer filter is 1. On the other hand, the number of feature maps (number of channels) obtained in the first and subsequent intermediate layers is the number of filters used for the convolution in the previous layer. Thus, the number of filter channels of the intermediate layers is determined according to the number of filters used for the convolution in the previous layer.

Several techniques have been known for the convolution, such as Stride for down-sampling a feature map obtained by the convolution, and Padding for performing the convolution after the zero padding around the feature map. Although the convolution may be made with these techniques, the resolution of the feature map obtained in that case is not given by the expression (6). This is because the resolution given by the expression (6) is a definition that assumes the convolution without Stride or Padding. Thus, when the above convolution technique is used, the image processing according to this embodiment may be performed using the definition of the resolution corresponding to the technique.

The input unit 103 is, but not limited to, the above CNN, which includes, for example, a PC, a workstation, an FPGA, and a server, and may be any computer that can realize the CNN computerization. The input unit 103 includes a plurality of CNNs having a plurality of filters of a plurality of types of sizes. That is, the input unit 103 outputs a feature map (information of the second feature amount) having different resolutions by convolving filters of a plurality of types of sizes with the input image acquired by the acquisition unit 101.

The expression (6) enables the feature map with different resolutions to be generated without using filters of a plurality of types of sizes. For example, the feature map with different resolutions can be generated by changing the number of convolutions of filters having 3×3 vertical and horizontal sizes (by changing the number of layers in the multilayer CNN). However, the function of the input unit 103 is to send the information of the input image to the intermediate layer in the main unit 102 to promote learning. Hence, it is preferable not to use as the input unit 103 the multilayer CNN that is difficult to learn.

The feature map with different resolutions (information of the first feature amount) obtained by the main unit 102 and the feature map with different resolutions (information of second feature amount) obtained by the input unit 103 are added to each other while their resolutions are equal to each other. More specifically, this addition is a sum for each element in the feature map. Further, a new feature map (information of the third feature amount) obtained as a result of the addition is sent to the next convolution layer of the main unit 102 or the output unit 104 described later after the nonlinear calculation. The feature maps (addition of the information of the first feature amount and the information of the second feature amount) may be added by any of the main unit 102, the input unit 103, and the output unit 104.

The vertical and horizontal sizes and the number of filters in the input unit 103 are determined according to the feature maps having different resolutions obtained in the main unit 102. This is because the feature map obtained by the main unit 102 and the feature map obtained by the input unit 103 having the same resolution as that of the main unit 102 are added to each other. The resolution and the number of feature maps are expressed by the expression (6). Since the input image is assumed to be a monochromatic image (the number of channels of 1), the number of filter channels in the input unit 103 is 1. However, if the input image is a colored image or a motion image (a plurality of images), the number of channels may be determined accordingly.

The output unit 104 is, but not limited to, the above CNN, which includes, for example, a PC, a workstation, an FPGA, and a server, and may be any computer that can implement the CNN computations. The output unit 104 performs the deconvolution (transposed convolution), the subsequent addition of the bias, and the nonlinear calculation for the multiscale (multiresolution) feature map (information of the third feature amount) obtained by the main unit 102 (or the input unit 103) using a plurality of filters of a plurality of types of sizes. Then, the output unit 104 converts the feature map into the output image by weighing the obtained feature map.

In addition, the deconvolution (transposed convolution) is called a decomposition or transposed convolution, and is intuitively an inverse operation of the convolution. A brief description will now be given of the deconvolution (transposed convolution). The convolution and the deconvolution (transposed convolution) are given by the following expression (7).

$$U = MV$$

$$Y = M^T X \quad (7)$$

In the expression (7), U and V are a feature map obtained by the convolution and the feature map to be convolved, respectively, and M is a matrix representing the convolution. The feature map is expressed as a vector by a proper conversion (such as a lexicographic array). Further, from the expression (6), the vector U is shorter (or lower in resolution) than the vector V. Hence, the convolution matrix M is a horizontally long matrix.

Similarly, Y and X are vector notations of a feature map obtained by the deconvolution (transposed convolution) and a feature map to be deconvolved (transposed-convolved), respectively. As is clear from the expression (7), the vectors Y and X are related by a transposed matrix $M^T$ of the convolution matrix M. The transposed matrix $M^T$ is a vertically long matrix. Hence, the vector Y is longer (or higher in resolution) than the vector X, and the deconvolution (transposed convolution) can be regarded as the inverse operation of the convolution.

The resolution of the feature map obtained by the deconvolution (transposed convolution) is given by the following expression (8) from the filter size used for the deconvolution (transposed convolution).

$$YH = H + FH - 1$$

$$YW = W + FW - 1 \quad (8)$$

In the expression (8), H and W are the vertical and horizontal sizes of the input image (or feature map to be deconvolved), YH and YW are the vertical and horizontal sizes of the output image (or the feature map obtained by the deconvolution), and FH and FW, respectively, are the vertical and horizontal sizes of the filter used for the deconvolution (transposed convolution). Thereby, it is understood that the image obtained by the deconvolution (transposed convolution) of the filter with the feature map is larger in size (higher in resolution) than the original feature map. Further, the number of feature maps obtained by the deconvolution (transposed convolution) is the number of filters used for the deconvolution (transposed convolution), similar to the convolution.

In this embodiment, the deconvolution (transposed convolution) is performed for the feature map obtained in the intermediate layer of the main unit 102. Therefore, the size of the filter and the number of channels used for the deconvolution (transposed convolution) may be determined according to the resolution and the number of feature maps obtained in the intermediate layer of the main unit 102. The number of filters used for the deconvolution (transposed convolution) is arbitrary. The higher the number of filters, the higher the accuracy of image processing can be expected. However, since the number of parameters increases accordingly, learning is expected to take a more time.

The nonlinear calculation in the output unit 104 uses, for example, the LReLU and PReLU that also output a negative value of a feature map. This is because when a feature map of a certain resolution is deconvolved and the resultant feature map contains only negative values and the ReLU is used for the nonlinear calculation, the resolution information is used for the image processing. Thus, the ReLU may be used for the nonlinear calculation in the output unit 104, but in this case, the image processing accuracy is lower than when the LReLU or PReLU is used.

The weight for the feature map obtained in the output unit 104 is given by the following expression (9).

$$Z = \sum_{i=1}^{M} \alpha_i Y_i + b \quad (9)$$

In the expression (9), $Y_i$ is an i-th feature map, $\alpha_i$ is a weight for $Y_i$, b is a constant, Z is the output image, and M is the total number of feature maps. This operation can also be regarded as the convolution of a filter with 1×1 vertical and horizontal sizes and the number of channels of M. Therefore, it is also possible to optimize the weighting simultaneously with the network learning by regarding the weighting as the convolution layer. Since the output image is assumed to be a monochromatic image (the number of channels of 1), the number of filters is 1 when weighting is regarded as the convolution. However, when the output image is a colored image or a motion image (a plurality of images), the number of filters may be determined accordingly. In addition, the pixel value may be normalized (such that the pixel values are located in a range of [0 1]) for the obtained output image.

This embodiment sends the input image information from the input unit 103 to the intermediate layer of the main unit 102 so as to promote the multilayer CNN learning. In addition, the multiscale feature map from the intermediate layer of the main unit 102 is returned to the original resolution by the output unit 104 and weighed so as to generate the output image. In other words, this embodiment uses the multiscale expression information. Hence, this embodiment can provide a network structure that is compatible with use of the multiscale expression information and the multilayer network learning.

Further, during the learning, an error between the output training image and its estimation is sent to the intermediate layer of the main unit 102 via the output unit 104. Therefore, the output unit 104 serves to promote the multilayer CNN learning in addition to the multiscale expression.

As the network parameters (filter and bias) of the main unit 102, the input unit 103, and the output unit 104, those previously generated from the training image by the above learning are used. In the learning, the main unit 102, the input unit 103, and the output unit 104 are connected so as to perform the learning as one CNN. That is, the input training image is input to the CNN (the main unit 102 and the input unit 103), and the learning is made so that the error is reduced between the image output from the CNN (the output unit 104) and the output training image. The initial value of the network parameter may use a random number such as Xavier (see Xavier Glorot, Yoshua Bengio, "Understanding the difficulty of training deep feedforward neural networks", Proceedings of the 13th International Conference on Artificial Intelligence and Statistics, 2010, pp. 249-256) or a normal random number, or a value generated by previous learning. The training image used for learning may be generated by a numerical calculation in consideration of the deterioration process in the acquisition unit 101 as described above, or may be prepared by another method. A specific training image generation method and preparation method will be described in the following embodiments.

An output image that is an image processing result obtained by the output unit 104 may be stored in an unillustrated storage unit in the image processing apparatus 100 or displayed on an unillustrated display unit outside the image processing apparatus 100. Alternatively, the output image may be stored in an illustrated storage medium outside the image processing apparatus 100 via an interface device such as an unillustrated CD-ROM drive and a USB interface. Since a known configuration can be used for the wiring and radio for communicating information (data) among the acquisition unit 101, the main unit 102, the input unit 103, and the output unit 104, a description thereof will be omitted.

The function of the image processing apparatus 100 may be implemented on the computer by causing the computer to execute a program describing the functions of the main unit 102, the input unit 103, and the output unit 104. Similarly, the function of the image processing apparatus 100 may be realized by installing a program describing the functions of the main unit 102, the input unit 103, and the output unit 104 into the VLSI as an electronic circuit.

Figure 2:
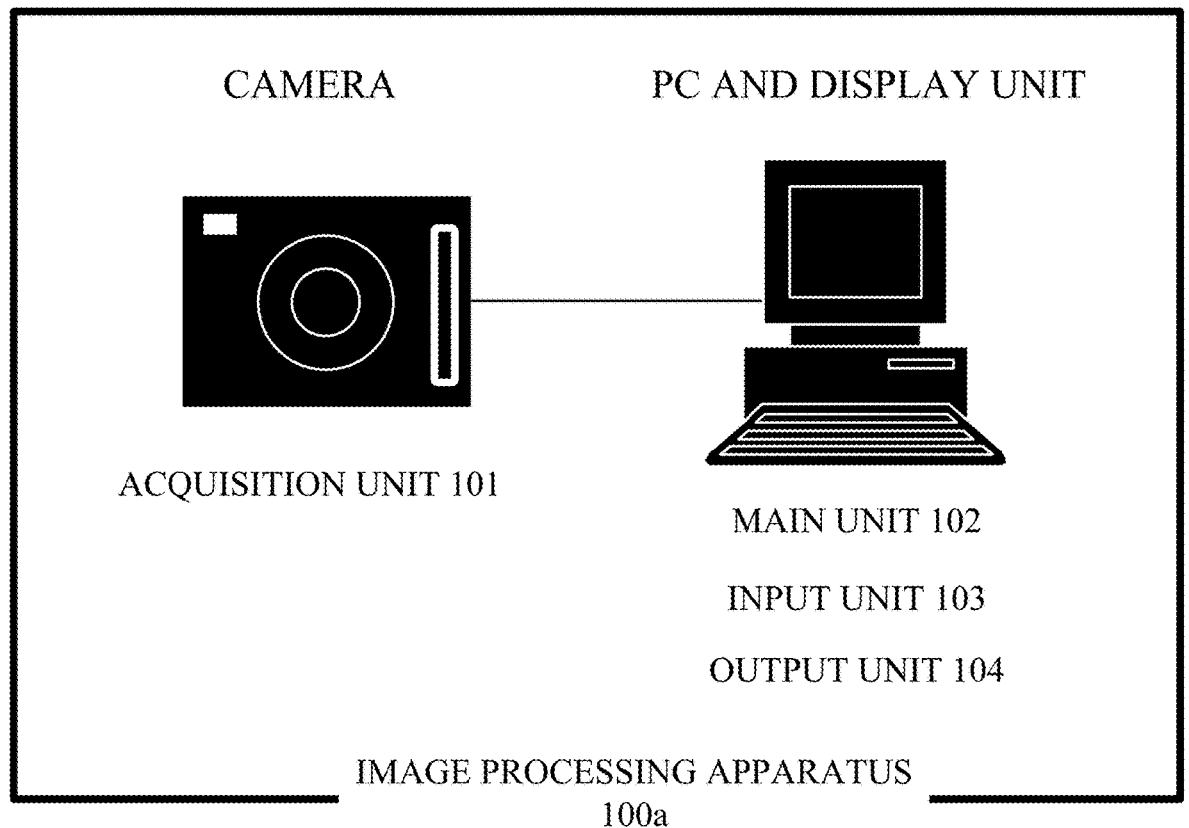
FIG. 2 is another configuration diagram of the image processing apparatus in each embodiment.

FIG. 2 is a configuration diagram of another type of image processing apparatus 100a. In FIG. 2, the acquisition unit 101 is a digital camera (imaging apparatus), the main unit 102, the input unit 103, and the output unit 104 are constituted by a PC, and an output image that is an image processing result is displayed on a display unit.

Figure 3:
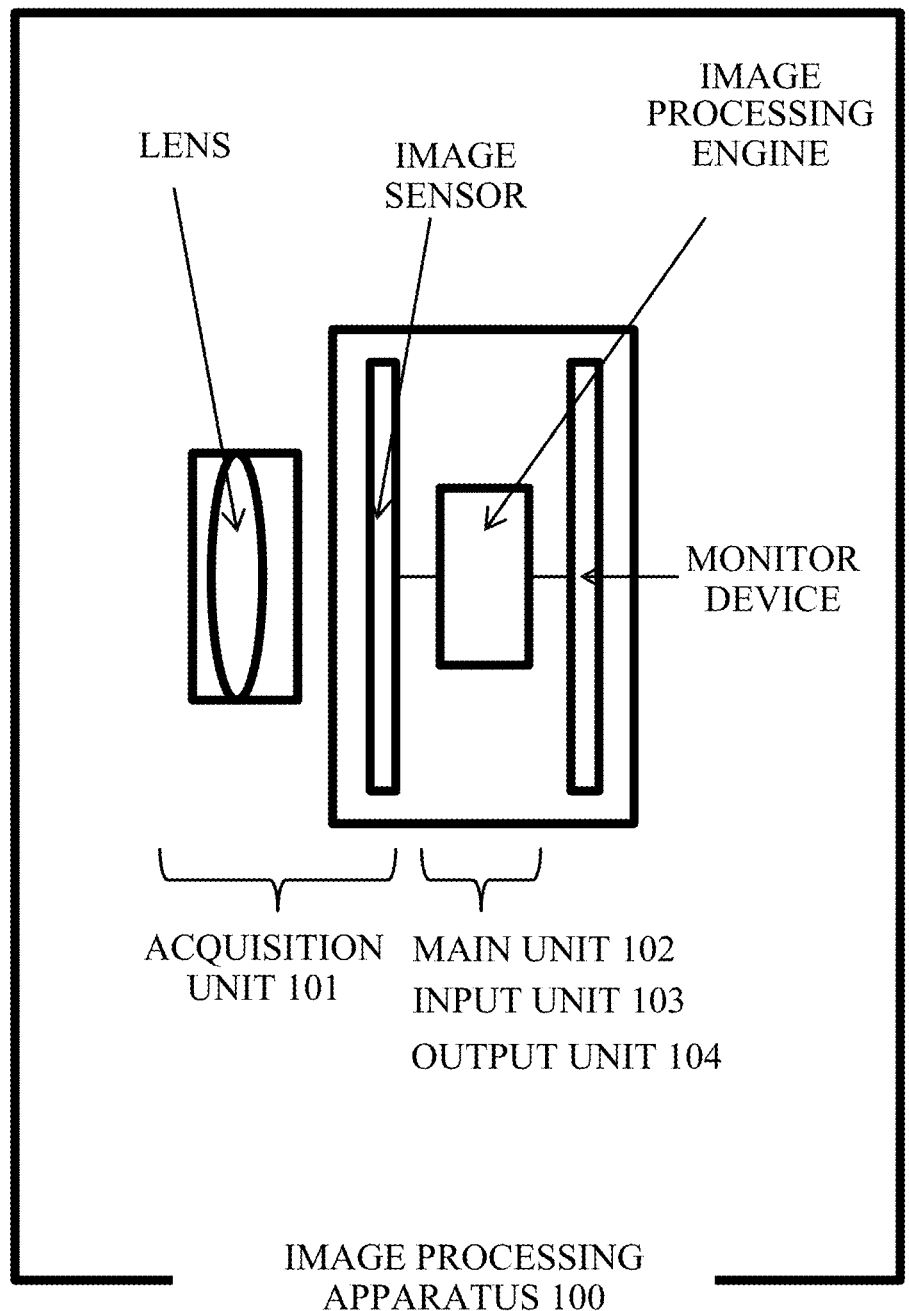
FIG. 3 is a configuration diagram in which the image processing apparatus in each embodiment is implemented as an imaging apparatus.

FIG. 3 is a configuration diagram of an image processing apparatus 100b according to another embodiment, and is a configuration diagram in which the image processing apparatus 100 is realized as a digital camera (imaging apparatus). The image processing apparatus 100b in FIG. 3 includes a lens, an image sensor, an image processing engine, and a monitor device. In FIG. 3, the acquisition unit 101 corresponds to an imaging unit that includes a lens (imaging optical system) and an image sensor (image pickup element). The main unit 102, the input unit 103, and the output unit 104 correspond to an image processing engine of a digital camera.

Figure 4:
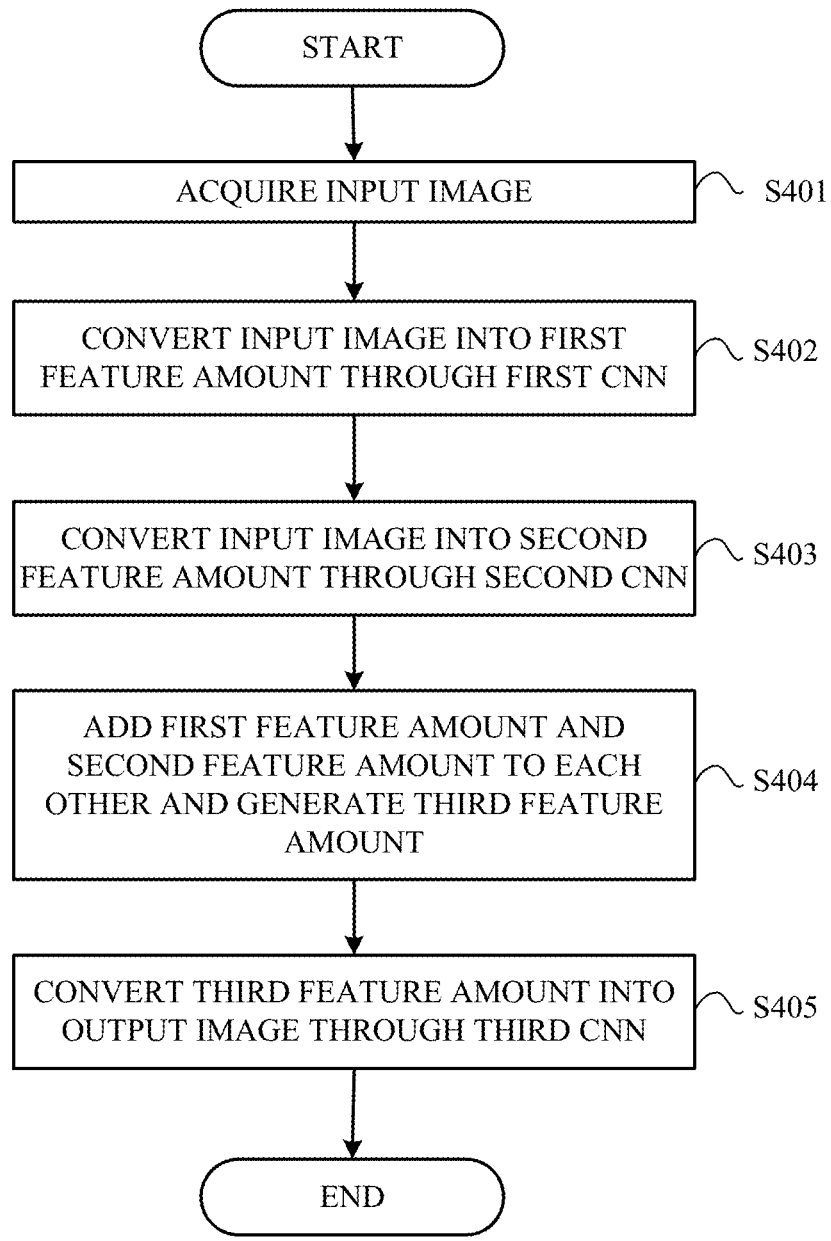
FIG. 4 is a flowchart showing an image processing method in each embodiment.

FIG. 4 is a flowchart showing an image processing method according to this embodiment. Each step in FIG. 4 is executed by the acquisition unit 101, the main unit 102, the input unit 103, or the output unit 104, for example, according to a program stored in the storage unit of the image processing apparatus 100.

First, in the step S401, the acquisition unit 101 acquires the input image. The input image is, for example, a deterioration image that is deteriorated by the imaging optical system.

Next, in the step S402, the main unit 102 converts the input image into the information of the first feature amount by using a first convolutional neural network (first CNN) having at least two layers (a plurality of layers). For example, the main unit 102 convolves a plurality of filters with the input image, and then repeats the nonlinear calculation processing so as to generate a multiscale feature map as the information of the first feature amount.

Next, in the step S403, the input unit 103 converts the input image into the information of the second feature amount using the second convolutional neural network (second CNN). For example, the input unit 103 generates a multiscale feature map as the information of the second feature amount by convolving a plurality of filters of a plurality of types of sizes with the input image.

Next, in the step S404, at least one of the main unit 102, the input unit 103, or the output unit 104 adds the information on the first feature amount and the information on the second feature amount to each other and generates the information of the third feature amount. Herein, the information on the first feature amount and the information on the second feature amount is added, for example, by calculating the sum of the information on the first feature amount and the information on the second feature amount having the same resolution as that of the information on the first feature amount for each element.

Next, in the step S405, the output unit 104 converts into the output image the information of the third feature amount generated by adding the information on the first feature amount and the information on the second feature amount using a third convolutional neural network (third CNN). For example, the output unit 104 deconvolves a plurality of filters of a plurality of types of sizes with the information of the third feature amount, performs the nonlinear calculation, and weighs the feature map, thereby converting the information on the third feature amount into the output image. For example, the LReLU or PReLU is used for the nonlinear calculation. The output image is a sharp image obtained by sharpening the input image. In this embodiment, preferably, the first filter and the first bias used in the first CNN are different from the second filter and the second bias used in the second CNN, respectively.

A description will now be given of embodiments showing the effects of the present invention.

First Embodiment

A description will now be given of a first embodiment according to the present invention. This embodiment illustrates a numerical calculation result obtained by a super resolution using a program describing the function of the image processing apparatus 100. Herein, the super resolution is an image processing technique for generating a high-resolution image from a low-resolution image acquired by an imaging apparatus including a low-resolution image sensor.

Figure 5:
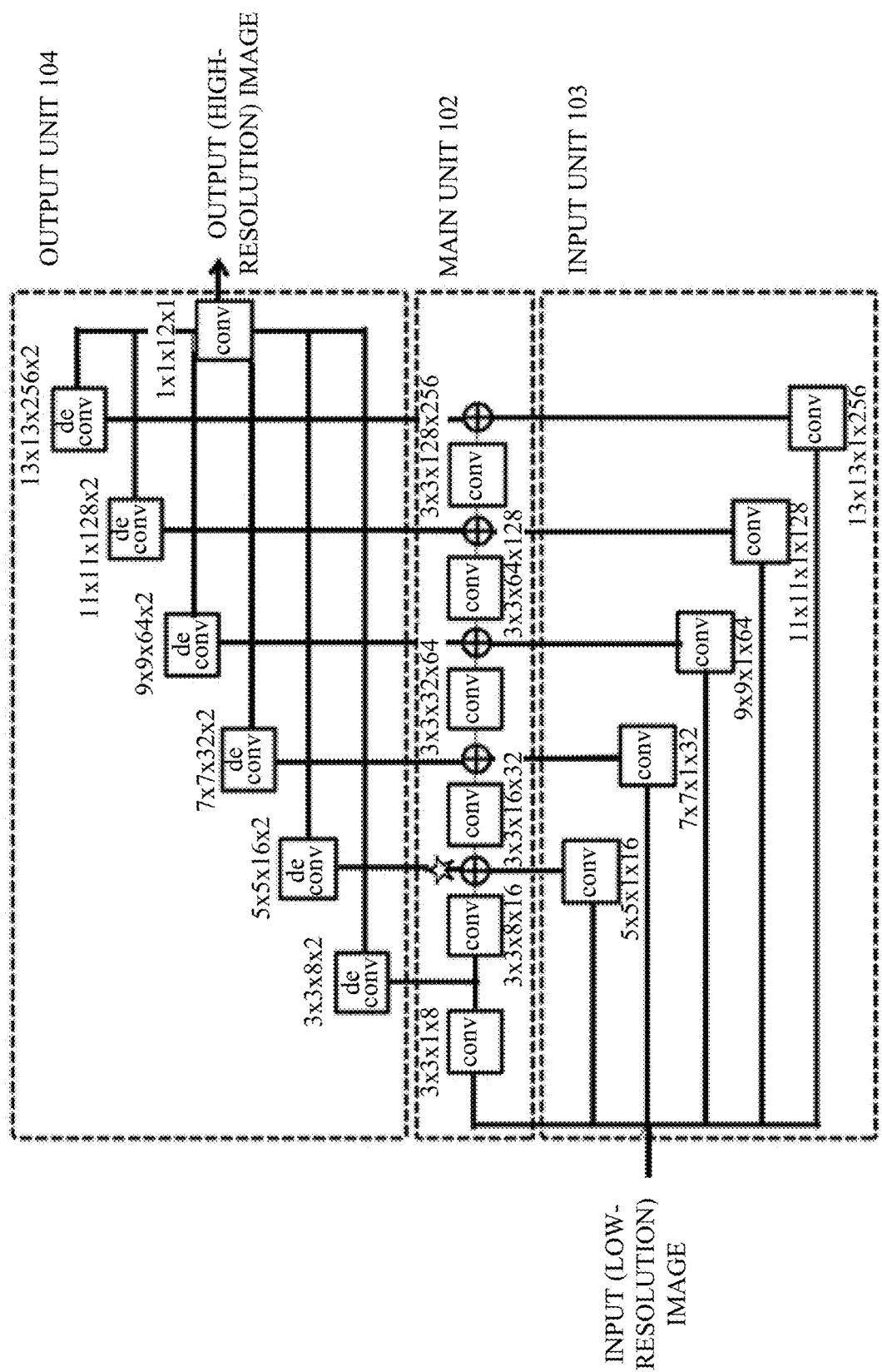
FIG. 5 is a diagram showing a network structure in the first embodiment.

Referring now to FIG. 5, a description will be given of a network structure of the CNN according to this embodiment. FIG. 5 is a diagram illustrating the network structure of the CNN. In the CNN in FIG. 5, cony represents a convolution layer, and deconv represents a deconvolution (transposed convolution) layer. In addition, a numeric string above each layer represents the vertical and horizontal sizes, the number of channels, and the number of the filters. For example, "3×3×1×8" in FIG. 5 indicates that the convolution or deconvolution (transposed convolution) is made with eight filters each having 3×3 vertical and horizontal sizes and a single channel.

A mark "⊕" in FIG. 5 represents a sum for each element in the feature map. A mark "☆" in FIG. 5 will be described later. In FIG. 5, the acquisition unit 101 is omitted and replaced with an input (low-resolution) image.

The main unit 102 includes a multilayer CNN that performs the filter convolution six times, the subsequent bias addition, and the nonlinear calculation. All filters have the 3×3 vertical and horizontal sizes, but this is for simplicity purposes, and this embodiment is not limited to this example. The nonlinear calculation uses the ReLU, but it is for simplicity purposes and this embodiment is not limited to this example. The main unit 102 is a six-layer multilayer CNN, but this embodiment is not limited to this example, and may have seven or eight layers.

The input unit 103 includes five CNNs having filter sizes different from one another. The filter size is as shown in FIG. 5. Herein, when the "☆" mark of the network is addressed, the main unit 102 sends a feature map obtained by convolving a filter of 3×3 vertical and horizontal sizes with the input image twice. On the other hand, the input unit 103 sends a feature map obtained by convolving a filter having 5×5 vertical and horizontal sizes with the input image once. These feature maps having the same resolutions (see the expression (6)) are added to each other, then subject to the nonlinear calculation, and sent to the next convolution layer in the main unit 102 and the output unit 104. The input unit 103 includes five CNNs having filter sizes different from one another, but this embodiment is not limited to this embodiment. For example, if the main unit 102 has seven layers, the input unit 103 may have six CNNs. Further, the CNN of the input unit 103 may be cut, when there is no resolution information in the input image or when it is demanded to save the memory capacity in the computer.

The output unit 104 has six CNNs having filter sizes different from one another. The filter size is as shown in FIG. 5. In addition, the LReLU is used for the nonlinear calculation. The output unit 104 includes the CNNs having six different filter sizes, but this embodiment is not limited to this example. For example, if the main unit 102 has seven layers, the input unit 103 may have seven CNNs. Similarly to the input unit 103, the CNN of the output unit 104 can be cut when there is no resolution information in the input image or when it is demanded to save the memory capacity in the computer.

The training image uses a low-resolution image (input training image) that is generated by adding a suitable blur to a high-resolution image (output training image) and then by averaging the 2×2 pixels of the obtained image for down-sampling them to half. More precisely, the input training image uses an image obtained by up-sampling the low-resolution image twice by the Bicubic interpolation. This is processing not for improving the image processing accuracy, but simply for equalizing the pixel number between the input image and the output image. The training image is a monochromatic image, and the pixel values are normalized so as to fall within the range of [0 1]. This is similarly applied to all the following images.

The initial values of the network parameter (filter and bias) use Xavier in all layers. Image processing may be performed using some of the network parameters obtained by learning. Thereby, the image processing accuracy is lowered, but the number of convolutions is reduced, so that fast processing can be expected. For example, three out of the five CNNs of the input unit 103 generated by learning may be used for the image processing. In the following, the image processing is performed using all network parameters obtained by learning without omitting them.

The learning is the SGD using the Adam method for the optimization method. The parameters of the Adam method include $\alpha=10^{-4}$, $\beta_1=0.9$, $\beta_2=0.999$, and $\varepsilon=10^{-8}$. In the SGD, 128 out of 76800 total training images are randomly selected and used. The number of learning iterations is $18\times10^4$ (300 epochs).

Figure 6C:
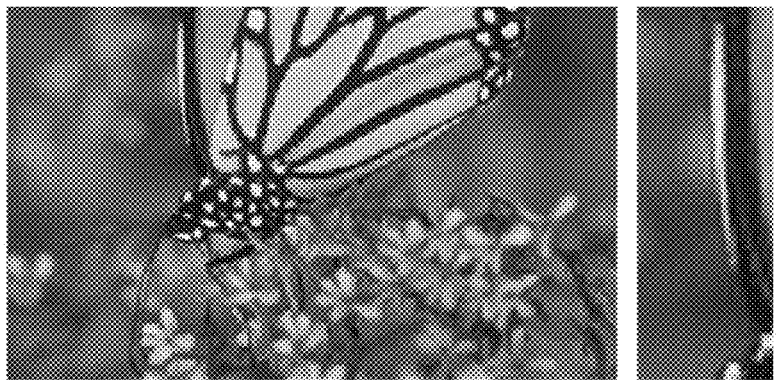
FIGS. 6A, 6B, and 6C are explanatory diagrams of an image processing result in the first embodiment.
Figure 6B:
Figure 6A:
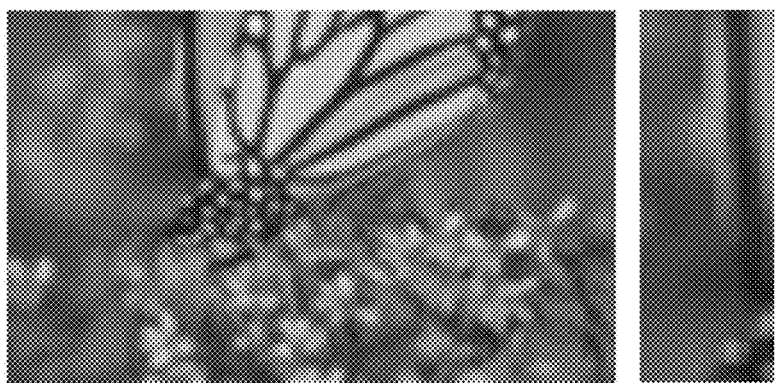

FIGS. 6A, 6B, and 6C are explanatory diagrams of an image processing result according to this embodiment. FIG. 6A illustrates the Bicubic interpolation image of the low-resolution image, FIG. 6B illustrates a high-resolution image according to this embodiment, and FIG. 6C illustrates a ground truth image. Lower part in each figure illustrates an enlarged view of part of each figure for better understanding. Thereby, according to this embodiment, it is qualitatively understood that a sharp (non-blurred) image can be obtained which is closer to the ground truth image than the interpolated image.

Next, the effect of this embodiment was quantitatively evaluated by a root mean square error (RMSE). The RMSE is given by the following expression (10).

$$RMSE(P, Q) = \sqrt{\frac{\sum_{i=1}^{M}(p_i - q_i)^2}{M}} \quad (10)$$

In the expression (10), P and Q are arbitrary M×1-dimensional vectors, and $p_i$ and $q_i$ are i-th elements of P and Q, respectively. The closer the RMSE is to zero, the more similar P and Q are. That is, it can be said that the closer the RMSE is to zero between the recovered image and the ground truth image, the higher the accuracy of the recovery is.

Table 1 shows the RMSE between the Bicubic interpolation image of the low-resolution image and of the ground truth image, and the RMSE between the high-resolution image according to the present invention and the ground truth image. Thereby, the latter is closer to zero than the former, so it can be quantitatively understood that super resolution is achieved.

TABLE 1

| RMSE between interpolated image of low-resolution image and ground truth image | RMSE between high-resolution image according to the present invention and ground truth image |
|---|---|
| 0.0650 | 0.0358 |

Next, this embodiment will be compared with prior art. The prior art used the super resolution technique RED-Net (Residual Encoder-Decoder Networks) based on the multi-layer CNN, which is disclosed in Xia-Jiao Mao, Chunhua Shen, Yu-Bin Yang, "Image restoration using convolutional auto-encoders with symmetric skip connections", arXiv: 1606.08921, 2016 (Mao et al.). The RED-Net has a network structure with a totally ten layers in which five convolution layers and five deconvolution (transposed convolution) layers arranged symmetrically to them are connected by a shortcut path. The learning is the SGD using the Adam method as an optimization method, similar to this embodiment. Further, the parameters and training images used in the Adam method and SGD are the similar to those in this embodiment. A more detailed network structure and learning method are described in Mao et al.

Figure 7:
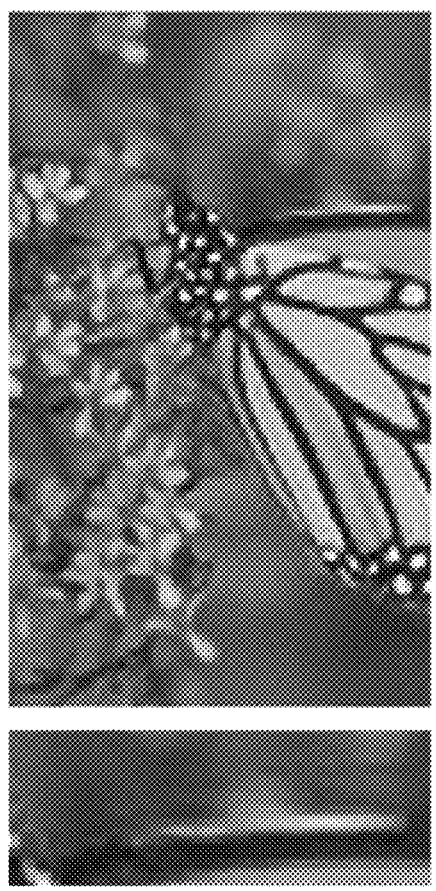
FIG. 7 is an explanatory drawing of an image processing result of prior art.

FIG. 7 is a high-resolution image according to the prior art. Thereby, it is understood that a sharp (non-blurred) image closer to the ground truth image than the interpolated image can be obtained. However, when the enlarged view is addressed, it is understood that a false edge (ringing) occurs near the edge in the high-resolution image according to the prior art. On the other hand, no false edge occurs in the image after the image processing according to this embodiment.

Table 2 shows the RMSE between the high-resolution image according to the prior art and the ground truth image.

TABLE 2

| RMSE between high-resolution image according to prior art and ground truth image |
|---|
| 0.0375 |

Since the RMSE between the high-resolution image according to this embodiment and the ground truth image is closer to zero than the RMSE between the high-resolution image according to the prior art and the ground truth image, it is quantitatively understood that this embodiment can provide a more accurate super resolution.

Figure 8:
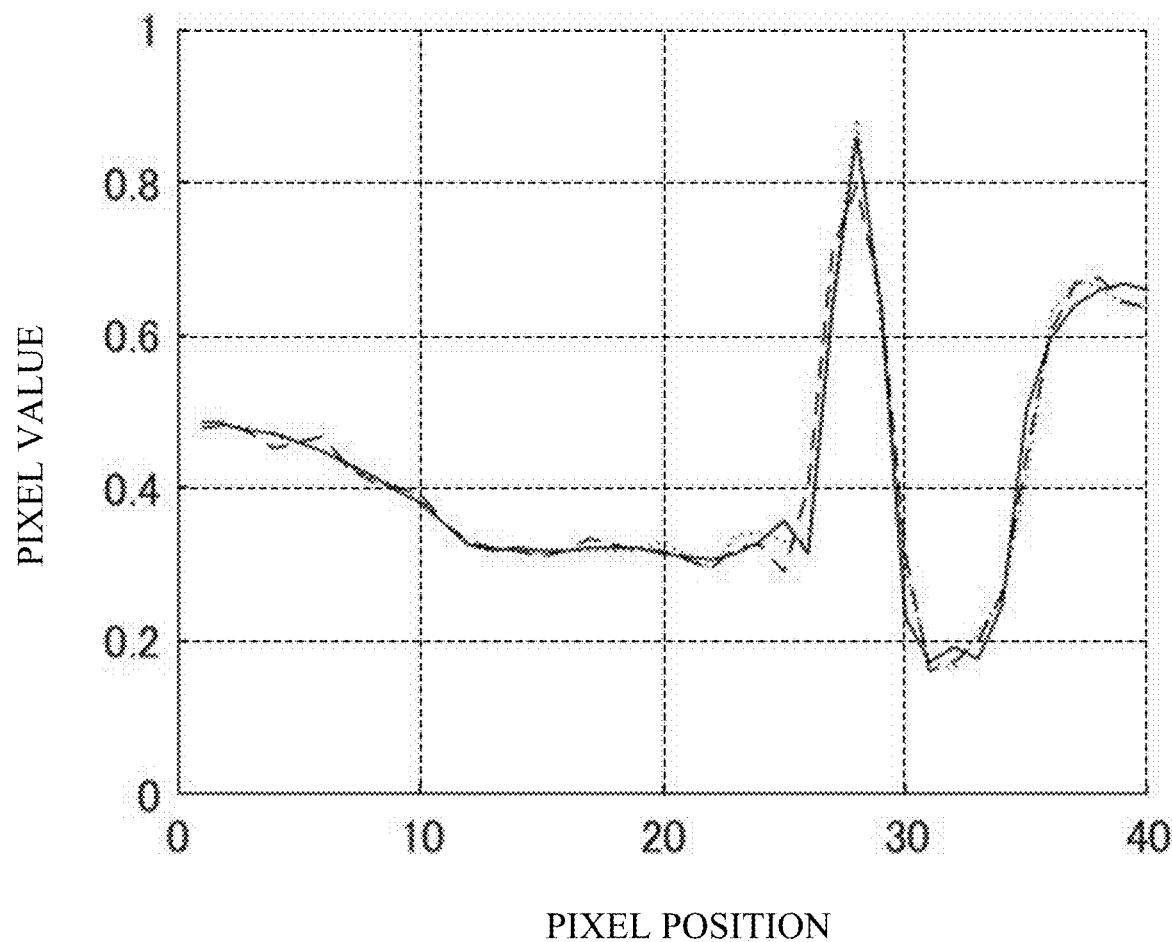
FIG. 8 is a comparison diagram between the first embodiment and the prior art.

For better understanding, FIG. 8 illustrates a sectional view of an enlarged view of this embodiment, the prior art, and the ground truth image. In FIG. 8, a solid line (-) represents the ground truth image, a broken line (-) represents the prior art, and a dotted line (..) represents the present invention. In FIG. 8, a horizontal axis indicates a pixel position of the section, and a vertical axis indicates the pixel value. The pixel values are normalized to be in a range of [0 1]. It is thereby understood that this embodiment (1) suppresses the artifact found in the prior art in the flat portion on the left of the graph, and (2) suppresses the artifact seen in the prior art at the base of the peak of the pixel value.

Second Embodiment

Next follows a description of a second embodiment according to the present invention. This embodiment will discuss deblurring using the image processing apparatus 100. The deblur is an image processing technique that removes a blur (typically the diffraction limit of the imaging optical system) mainly caused by the acquisition unit 101 in the image processing apparatus 100 from the blur image. Since this embodiment differs from the first embodiment in generation method of the training image, only the generation method of a training image will be described.

A training image uses a blurred image (input training image) generated by adding a blur to a sharp image (output training image). Herein, the blur is caused by a deterioration factor of the acquisition unit 101. More specifically, when the acquisition unit 101 is a digital camera, it is caused by an aberration of the imaging optical system, an optical low-pass filter, a pixel aperture in the image sensor, and the like. The training image is generated by the numerical calculation on the assumption that all of these deterioration processes are known. Alternatively, the training image is prepared by capturing a known object with a digital camera. After the network parameter is learned using the training image, the input image (blurred image) is processed by the image processing apparatus 100 using the obtained parameter similar to the first embodiment.

Third Embodiment

Next follows a description of a third embodiment according to the present invention. This embodiment will discuss an image recognition using the image processing apparatus 100. The image recognition is an image processing technique for classifying input images into predetermined classes (sets). For example, the image processing technique for classifying the alphabetic character images into 26 classes is known as an optical character recognition (OCR). While there are various definitions and types of image recognition, this embodiment uses the above definitions for simplicity purposes. This embodiment will discuss only differences from the first embodiment or the second embodiment.

In the image recognition, the output of the output unit 104 is not an image but is generally a number representing a class as a recognition result. Therefore, a network specialized in outputting numbers (a fully connected neural network) is added to the output unit 104. The training image used for learning is a data set including an input training image and a class to which the training image belongs. Since it is difficult to generate this training image by the numerical calculation, it is common to prepare it using human hands. That is, training images are prepared by collecting many images on the website, by trimming and down-sampling them to an appropriate size and resolution, and by sorting them with the human eyes. Finally, after the network parameters are learned using this training image, the input image can be recognized by processing the input image with the image processing apparatus 100, similar to the first embodiment using the obtained parameter.

The learning method of the fully connected neural network is the same as the learning method of the CNN. This is because the CNN is ultimately one type of the fully connected neural network, but a detailed description will now be omitted.

An appropriate classifier may be used instead of the fully connected neural network. For example, a support vector machine (Support Vector Machines; SVMs) or a random decision tree (RF) may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing apparatus, an imaging apparatus, an image processing method, and a storage medium, each of which can perform highly accurate image processing using a network structure that is compatible with use of multiscale expression information and multilayer network learning.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising one or more processors configured to:
    convert an input image into information of a first feature amount by inputting the input image to a convolution layer of a first convolutional neural network including at least two layers;
    convert the input image with a same resolution as the input image input to the convolution layer of the first convolutional neural network into information of a second feature amount by inputting the input image with the same resolution as the input image input to the convolution layer of the first convolutional neural network to a convolution layer of a second convolutional neural network; and
    convert information of a feature amount including a third feature amount generated by adding the information of the first feature amount and the information of the second feature amount to each other, into an output image using a third convolutional neural network.

2. The image processing apparatus according to claim 1, wherein the one or more processors, in converting the input image into the information of the first feature amount, generate a multiscale feature map as the information of the first feature amount by repeatedly performing nonlinear calculation processing after convolving a plurality of filters with the input image.

3. The image processing apparatus according to claim 1, wherein the one or more processors, in converting the input image with the same resolution as the input image input to the convolution layer of the first convolutional neural network, generate a multiscale feature map as the information of the second feature amount by convolving a plurality of filters of a plurality of types of sizes with the input image.

4. The image processing apparatus according to claim 1, wherein the information of the first feature amount and the information of the second feature amount are added to each other by calculating a sum of the information of the first feature amount and the information of the second feature amount having the same scale as that of the information of the first feature amount for each element.

5. The image processing apparatus according to claim 1, wherein the one or more processors generate the information of the third feature amount by adding the information of the first feature amount and the information of the second feature amount to each other.

6. The image processing apparatus according to claim 1, wherein the one or more processors convert the information of the third feature amount into the output image by deconvolving a plurality of filters of a plurality of types of sizes with the information of the third feature amount and then by weighing a feature map obtained by performing a nonlinear calculation.

7. The image processing apparatus according to claim 6, wherein the one or more processors, in converting the information of the feature amount including the third feature amount, use Leaky ReLU or Parametric ReLU for the nonlinear calculation.

8. The image processing apparatus according to claim 1, wherein:
    the first convolutional neural network uses a first filter and a first bias, and
    the second convolutional neural network uses a second filter and a second bias, which are different from the first filter and the first bias, respectively.

9. The image processing apparatus according to claim 1, wherein the one or more processors:
    are further configured to acquire the input image,
    convert the acquired input image into the information of the first feature amount, and
    convert the acquired input image into the information of the second feature amount.

10. The image processing apparatus according to claim 9, wherein the acquired input image is a deteriorated image.

11. The image processing apparatus according to claim 1, wherein the one or more processors, in converting the information of the feature amount including the third feature amount, output a sharp image obtained by sharpening the input image as the output image.

12. An imaging apparatus comprising:
    the image processing apparatus according to claim 1; and
    an imaging apparatus that acquires the input image.

13. An image processing method comprising the steps of:
    converting an input image into information of a first feature amount by inputting the input image to a convolution layer of a first convolutional neural network including at least two layers;
    converting the input image with a same resolution as the input image input to the convolution layer of the first convolutional neural network into information of a second feature amount by inputting the input image with the same resolution as the input image input to the convolution layer of the first convolutional neural network to a convolution layer of a second convolutional neural network; and
    converting information of a feature amount including a third feature amount generated by adding the information of the first feature amount and the information of the second feature amount to each other, into an output image using a third convolutional neural network.

14. A non-transitory computer-readable storage medium storing a program executable by a computer to execute the image processing method according to claim 13.

15. An image processing apparatus comprising one or more processors configured to:
    convert an input image into information of a first feature amount using a first convolutional neural network including at least two layers;
    convert the input image into information of a second feature amount using a second convolutional neural network; and
    convert information of a third feature amount generated by adding the information of the first feature amount and the information of the second feature amount to each other, into an output image using a third convolutional neural network,
wherein the one or more processors, in converting the input image into the information of the first feature amount, generate a multiscale feature map as the information of the first feature amount by repeatedly performing nonlinear calculation processing after convolving a plurality of filters with the input image.

16. An image processing apparatus comprising one or more processors configured to:
   convert an input image into information of a first feature amount using a first convolutional neural network having at least two layers;
   convert the input image into information of a second feature amount using a second convolutional neural network; and
   convert information of a third feature amount generated by adding the information of the first feature amount and the information of the second feature amount to each other, into an output image using a third convolutional neural network,
   wherein the one or more processors convert the information of the third feature amount into the output image by deconvolving a plurality of filters of a plurality of types of sizes with the information of the third feature amount and then by weighing a feature map obtained by performing a nonlinear calculation.

17. An image processing apparatus comprising one or more processors configured to:
   acquire an input image;
   convert the acquired input image into information of a first feature amount using a first convolutional neural network including at least two layers;
   convert the acquired input image into information of a second feature amount using a second convolutional neural network; and
   convert information of a third feature amount generated by adding the information of the first feature amount and the information of the second feature amount to each other, into an output image using a third convolutional neural network.

* * * * *